Feb. 16, 1943.     T. ULRICH     2,311,420
VEHICLE SPRING SUSPENSION SYSTEM
Filed Oct. 30, 1939     2 Sheets-Sheet 2
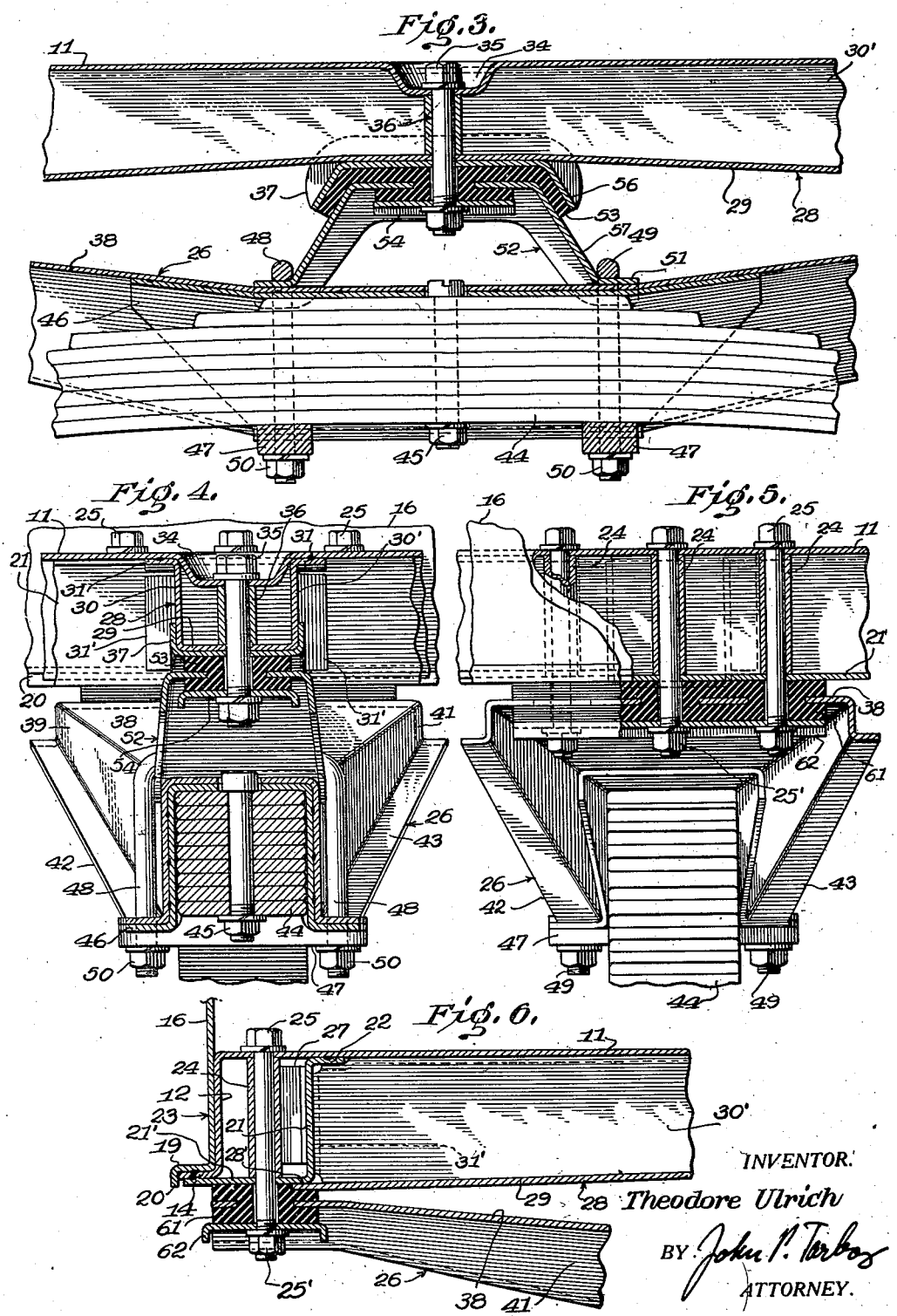
INVENTOR.
Theodore Ulrich
BY John P. Tarbox
ATTORNEY.

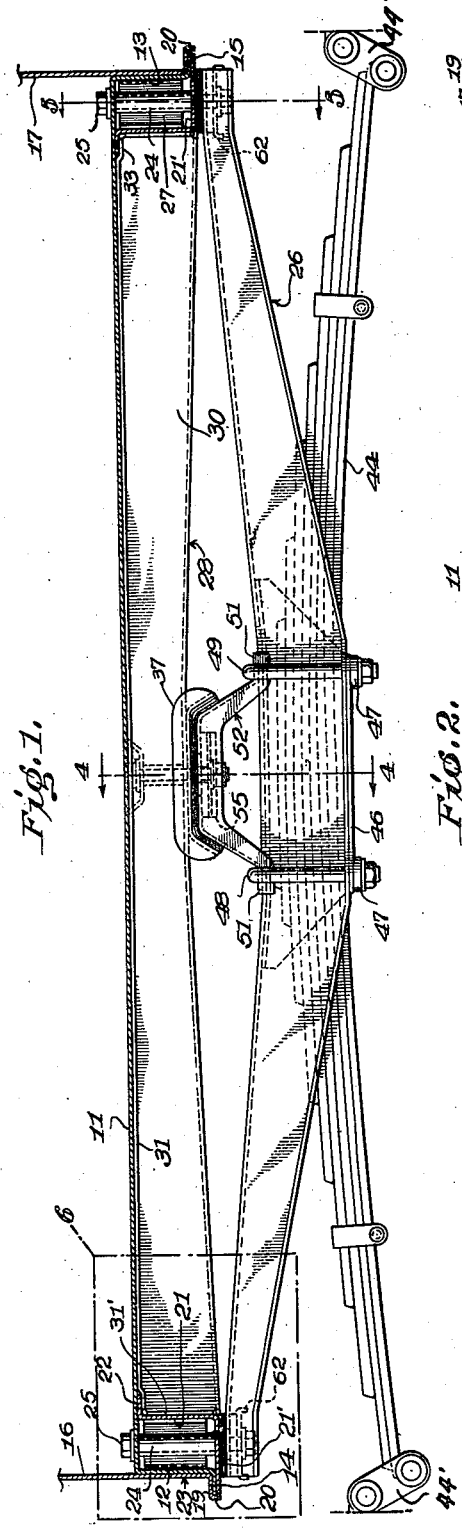
Feb. 16, 1943. T. ULRICH 2,311,420
VEHICLE SPRING SUSPENSION SYSTEM
Filed Oct. 30, 1939 2 Sheets-Sheet 1
INVENTOR.
Theodore Ulrich
BY John P. Tarbox
ATTORNEY.

Patented Feb. 16, 1943

2,311,420

UNITED STATES PATENT OFFICE 2,311,420

VEHICLE SPRING SUSPENSION SYSTEM

Theodore Ulrich, Detroit, Mich., assignor to Edward G. Budd Manufacturing Company, Philadelphia, Pa., a corporation of Pennsylvania Application October 30, 1939, Serial No. 301,917

12 Claims. (Cl. 280—106.5)

This invention relates in general to automobile chassis construction and more particularly to improved means for adapting a rear spring suspension system thereto.

The principal object of the invention is to provide an improved method and means for applying a transverse rear spring assembly to an automobile chassis with a view to a more effective silencing and vibration-dampening of the chassis, and an increased resistance to all stresses including static, torsional and shock loads, as well as side thrust and shearing stresses.

Another object is the provision of improved means for preventing the transmission of road noises from the running gear of a vehicle to the body thereof.

Another object is to adapt a transverse rear spring assembly to vehicle chassis construction in such manner as to insulate the assembly from the chassis while attaining a proper reinforced support and a correct tie-in to the adjacent chassis side members.

A further object is to provide a rear spring carrier so constructed and connected to adjacent chassis members as to insulate certain load-supporting components of the chassis from other portions thereof, and effectively distribute loads and stresses via the spring assembly over a comparatively wide area of the side sills, floor and side panel assembly.

With the foregoing and other objects which will appear as the description proceeds, the invention resides in the combination and arrangement of parts, and in the details of contruction hereinafter described and claimed, it being understood that various changes in the precise embodiment of the invention herein disclosed may be made within the scope of what is claimed without departing from the spirit thereof.

The invention will be best understood by reference to the drawings wherein:

Figure 1 is an elevational view, partly in section, as seen in the direction of the longitudinal axis of the vehicle;

Figure 2 is a plan view of the arrangement with portions of the floor panel of the vehicle broken away to show more clearly certain details of construction including the general disposition of the welding flanges;

Figure 3 is a fragmentary, enlarged, longitudinal sectional view, taken on the line and as viewed in the direction of the arrows 3—3 of Figure 2, and showing in detail the method of insulating the floor cross sill from the transverse spring carrier;

Figure 4 is a fragmentary enlarged sectional detail view, taken on the line and as seen in the direction of the arrows 4—4 of Figure 1, with parts broken away for clearer illustration; and showing, among other details, how the rear spring carrier is reinforced adjacent its connection with the spring;

Figure 5 is a view similar to Fig. 4, taken on the line and as seen in the direction of the arrows 5—5 of Fig. 1, and showing how the rear spring carrier distributes loads and stresses via the rear spring carrier end cushions to a wide area of the side sill, floor and side panel assembly; and Figure 6 is an enlarged, fragmentary, longitudinal sectional view of the parts enclosed by line 6 of Fig. 1 and taken on the extension of line and as seen in the direction of the arrows 3—3 of Fig. 2; and showing in detail the insulation of the floor cross sill from the side sills.

Referring now to the drawings wherein similar characters of reference indicate corresponding parts in the several views, the numeral 11 designates the floor panel of a vehicle. The floor panel 11, as best shown in Figure 1, has depending side walls or flanges 12, 13 which latter in turn have laterally projecting flanged edges 14, 15. The side walls 12, 13 and their flanged edges 14, 15 are welded to adjacent portions of the body side panels 16, 17 as described hereinafter.

Each of the oppositely disposed and similar body side panels 16, 17 at a lower portion thereof has a flange 19 ending in a narrow downturned flange 20, the flange 19 being welded to flange 14 of the floor panel 11. An angle member 21 on each side of the vehicle has a flange 22 welded to the under surface of the main body and its lower arm 21' to the flange 14 of floor panel 11.

As best shown in Fig. 6, it will be seen that the flange 20 overlies the adjacent edges of the flange 14 or 15 respectively and the arm 21'. The angle member 21 in conjunction with the flanged side wall 12 or 13 form closed box sectional side sills stretching longitudinally on each side of the vehicle chassis and indicated generally at 23.

Spacing tubes 24 within each side sill 23 reinforce the latter and accommodate side holddown bolts 25 which, as hereinafter described, secure the said side sills to the transverse rear spring carrier, designated generally at 26. Angle members 27 (Figs. 2 and 6), welded to or forming a part of the spacing tubes and being welded to adjacent portions of the side sills 23, anchor the said spacing tubes to the latter and reinforce same.

The floor panel 11 mentioned above, is suitably braced by a floor cross sill 28 which is formed of a substantially U-shaped channel member having a central web or bottom 29 integral opposed side walls 30, 30' and flanges 31 unitary with the latter and welded to the adjacent underneath surface of the floor panel 11.

At the junction of the cross sill side walls 30, 30' with the web 29 and with their flanges 31, each cross sill 28 is slit at its opposite ends thereby permitting the said side walls to be bent at right angles thereto to provide abutments or auxiliary flanges 31' which engage and are welded to the channel members 21 of the adjacent side sill 23 (Fig. 4). The web 29, by this procedure, is formed with a tongue 28' which is projected under and welded to the bottom of the side sill channel member 21. The ends of the flanges 31 may now be slightly bent at their ends and projected under the flange 22 of the adjacent cross sill angle member 21, as at 33, to which they are welded.

The floor panel 11 has a depressed central portion 34 apertured to receive a center hold-down bolt 35. The stem of the bolt 35 passes through a spacing tube 36, and through registering holes in the web portion 29 of the floor cross sill 28 and a cross sill reinforcement member or saddle 37 (Fig. 4) which is welded to the center portion of the said cross sill.

The transverse rear spring carrier 26 referred to above, is formed of a channel member having a web 38 which convergingly tapers in its width and slopes downwardly from its opposite ends to a depressed central portion. The web 38 has integral side walls 39, 41 provided with lateral flanges 42, 43.

A spring assembly 44 arranged within the channel of the member 26 has its leaves clamped by a bolt and nut, as at 45, the spring assembly 44 being encased at a central portion by a spring-carrier flanged reinforcement member 46 concentrically located and welded within the carrier member 26, and by a spring pad or plate 47. Registering holes in the flanges of the reinforcement member 46 and carrier 26, and aligned holes in the pad 47 receive the stems of spring clips 48, 49. Nuts 50 threaded on the ends of the spring clips clamp the pad 47 to the spring assembly 44 and thereby fasten the spring to the reinforcement member 46 and the carrier 26. 44' are the customary shackles or links connecting the ends of the spring 44 to the (not shown) wheel supports.

The upper portions of the U-shaped spring clips 48, 49 are clampingly engaged with the extended feet 51 of a yoke member 52 which secures the central portion of the spring carrier 26 to the midsection of the floor cross sill 27 through the intermediary of a central rubber cushion 53, as hereinafter described.

By inspection of Figs. 1, 3 and 4 it will be observed that the rubber cushion 53 is vulcanized to the cross sill reinforcement member or saddle 37 and to a flanged clip or plate 54 seated in a recess, as at 55, provided in the body portion of the yoke 52. The rubber cushion 53, as best seen in Figure 3, is embedded or vulcanized in the recess 55 in such wise as to embrace downwardly-directed, integral wall portions 56, 57 of the member 37 and the yoke 52 respectively (Figs. 3 and 4), the plate 54 being engaged directly by the central hold-down bolts 35 on whose threaded extremity a nut serves to adjustably retain the plate 54 in clamping engagement with the rubber cushion 53. The center rubber cushion 53, it will be noted, it kept under compression over its entire area by the center hold-down bolt 35, the member 37 and the clip 54, while the spring carrier 26 itself is reinforced over those portions which absorb the loads and stresses transmitted to it via the transverse spring.

The opposite ends of the spring carrier 26, in a somewhat similar fashion, are connected to the side sills 23 by rubber cushions 61. This latter arrangement is best shown in Figs. 5 and 6 wherein the one end cushion 61 is juxtaposed against the bottom surface of the side sill 23 and preferably vulcanized to a flanged clip or plate 62 arranged on the end of the spring carrier 26, and connected to the side sill 23 by the side hold-down bolts 25 and nuts 25'.

The opposite flared ends of the wall 38 of the spring carrier 26 are provided with wide holes concentric to the bolts 25 and embedded in and preferably vulcanized to the rubber cushions 61, the rubber extending through those holes. The opposite ends of the spring carrier 26, it will now be seen, are completely insulated from the chassis although resiliently connected thereto by the rubber cushions 61. All loads and stresses will be distributed through the rubber cushions to comparatively wide areas of the side sills, the said cushions being maintained under compression by the side hold-down bolts 25.

The general mechanical advantages afforded by the instant construction in the way of a stronger, more rigid and quieter chassis and the convenient manner in which the component parts of the structure are operatively joined, have been in large measure described above. This system, of course, lends itself to conventional methods of absorbing driving and braking torque through the intermediary of torque tube and radius rods which may be conveniently used with the spring suspension construction shown.

It is to be understood that the invention is susceptible to some variation and modification, and it is therefore desired that the present embodiment be considered in all respects as illustrative and not restrictive, reference being had to the appended claims rather than the foregoing description to indicate the scope of the invention; and it will be further understood that each and every novel feature and combination present in or possessed by the mechanism herein disclosed forms a part of the invention included in this application. It is especially to be understood that the invention is not restricted to a rear spring suspension of an automobile but it may also be used for the front wheel suspension or for the suspension of the wheels of other vehicles or even more generally for the attachment of leaf springs for other purposes. It is moreover to be understood that the word chassis as used in the appended claims is meant in its broadest sense so as to include self-supporting bodies and combined chassis/body underframe structures.

What I claim is:

1. In combination with a vehicle chassis construction having longitudinally extending side sills, a cross sill arranged transversely between and fastened to the side sills, and a spring assembly arranged below all of said sills; a spring carrier fastened to a central portion of the spring assembly, silencing and vibration dampening such as rubber cushioning means secured to the side sills and cross sill, and means secured to the spring carrier for operatively connecting it to the side and cross sills through the intermediary of said cushioning means.

2. In combination with a vehicle chassis construction having side sills, a cross sill fastened to and between the side sills, a spring assembly arranged in a plane substantially normal to the side sills, and a spring carrier arranged substantially parallel to the longitudinal axis of the spring assembly; silencing and vibration dampening such as rubber cushioning means arranged on the side sills and connecting them to the spring carrier, a yoke fastened to the spring carrier, a recess formed in the yoke, and silencing and vibration dampening such as rubber cushioning means arranged in the recess and connecting the yoke and the cross sill.

3. In combination with a vehicle chassis construction having a cross sill, side sills welded to the cross sill, a spring arranged transversely to the side sills, and a spring carrier for supporting the spring; silencing and vibration dampening such as rubber cushioning means clampingly connected to a central portion of the cross sill and associated with means connected to the spring carrier, other silencing and vibration dampening such as rubber cushioning means clampingly secured to the side sills, and the ends of the spring carrier being adhesively connected with said cushioning means.

4. In a vehicle chassis construction having side sills, a cross sill welded to the side sills, a floor panel welded to both the cross sill and side sills, and a spring arranged transversely of the side sills; a spring carrier including a channel member wherein a portion of the spring is accommodated, a yoke fastened to a central portion of the carrier, said yoke having a recess, a plate arranged adjacent the recess, a silencing and vibration dampening such as a rubber cushion seated in the recess and fastened to the plate, means securing the plate and consequently the yoke, the spring carrier and the cross sill together, and means including silencing and vibration dampening such as rubber cushions interposed between the ends of the carrier and the side sills operatively connecting them together.

5. In combination with a vehicle chassis construction having side sills, a floor panel welded to the side sills, a cross sill arranged transversely and welded to the side sills, flanges formed on the side sills and welded to the floor panel, and a spring located transversely to the side sills; a spring carrier adapted to accommodate a central portion of the spring, a reinforcement member within the carrier and adapted to directly engage a central portion of the spring, a yoke arranged between the cross sill and the carrier, spring clips fastening the yoke to the carrier and coactingly engaged with means confining the central portion of the spring within the carrier, a silencing and vibration dampening such as a rubber cushion interposed between and mechanically connecting the yoke and the cross sill together, and other silencing and vibration dampening such as rubber cushioning means interposed between the ends of the carrier and adjacent portions of the side sills and adapted to mechanically connect them together.

6. In an automobile chassis construction of the character described and having body side panels, a floor panel welded to the body side panels, side sills welded to the side panels and to the floor panel, a cross sill welded to the floor panel and to the side sills, and a spring arranged in a plane substantially normal to the side sills; a spring carrier mechanically connected to the spring, a spring carrier reinforcement member directly engaging the spring and housed in a portion of the spring carrier, means including a yoke and threaded members for securing the carrier, reinforcement member and spring together, silencing and vibration dampening such as rubber cushions secured to the side sills and fastened to widened ends of the carrier, and other means including a silencing and vibration dampening such as a rubber cushion adhesively connected such as by vulcanizing to the yoke and clamped to the cross sill, whereby said carrier is operatively connected to but insulated from the spring and the side sills.

7. In a vehicle chassis construction of the character described and having body side panels, side sills welded to the side panels, a cross sill welded to the side sills, and a spring arranged in a plane substantially normal to the side sills; a spring carrier arranged in a plane substantially parallel to the spring, a channel formed in said carrier for accommodating the spring, a reinforcement member arranged in a central portion of the carrier and directly contacting the spring, means including clips and a plate for securing the spring and reinforcement member operatively to the carrier, a yoke arranged on the spring carrier and fastened thereto, said yoke having a pocket adapted to receive a silencing and vibration dampening such as a rubber cushion, means for securing said cushion to the cross sill, a plate located at each end of the carrier, a silencing and vibration dampening such as a rubber cushion arranged on each of the plates, and the ends of the carrier being embedded in each of the last mentioned cushions for securing them and consequently the spring carrier to the side sills.

8. In a vehicle structure; an elongated structural member, a second elongated structural member, said second member being connected to a spring; said second member being coextensive with a considerable part of and being arranged underneath said first member, at least three separate pads of resilient silencing and vibration dampening material being inserted between said second member and said first member at points spaced from one another and distributed over the longitudinal coextensive region of said members, one pad being arranged in the region of said second member in which said spring is connected and two other pads being arranged at substantially equal distances on different sides of the aforesaid pad.

9. In a leaf spring suspension, an elongated channel member having a central portion adapted to embrace and to hold a leaf spring, a rigid adjacent structure, said central portion and both end portions of said member being fastened to said structure by means of silencing and vibration dampening such as rubber cushions so as to transmit at least part of the load directly from said central portion to said structure by means of said cushion which is arranged at said central portion and so as to function as a reinforcement for said structure.

10. In a motor vehicle, the combination of a vehicle frame, a floating carrier anchored to the frame, a transversely extending leaf spring, means connecting said spring to a central region of said carrier, and vibration damping such as rubber means acting between said central region and lateral points of said frame and said carrier to resist floating movement of the latter.

11. In a motor vehicle, the combination of a vehicle frame having side sill structure and a cross member, an inverted channel carrier generally coextensive with and arranged beneath said cross member, said carrier having outwardly extending front and rear edge portions, resilient insulation means between said cross member and a central portion of said carrier, further resilient insulation means between said carrier and said side sill structures, means anchoring said carrier to said cross member and said side sill structures but allowing a limited vertical movement thereof relatively, and a transversely extending leaf spring lying within and fixed to the central portion of said carrier.

12. In a motor vehicle, the combination of a vehicle frame having lateral longitudinal reinforcing structures and a cross member, an inverted channel carrier generally coextensive with and located beneath said cross member, resilient insulation means inserted between a central portion and lateral portions of said carrier on the one hand and a central portion of the cross member and portions of the lateral reinforcing structures on the other hand, said means being adapted for damping relative vertical and horizontal movement of said frame and said carrier, and means anchoring the carrier to the cross member and the lateral reinforcing structures.

THEODORE ULRICH.